US007997815B2

(12) United States Patent
Ito et al.

(10) Patent No.: US 7,997,815 B2
(45) Date of Patent: Aug. 16, 2011

(54) PRINTER

(75) Inventors: Akira Ito, Ashiya (JP); Koshiro Yamaguchi, Kakamigahara (JP); Norie Ito, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 868 days.

(21) Appl. No.: 12/009,705

(22) Filed: Jan. 22, 2008

(65) Prior Publication Data

US 2008/0181703 A1 Jul. 31, 2008

(30) Foreign Application Priority Data

Jan. 22, 2007 (JP) ................................ 2007-011063

(51) Int. Cl.
*B41J 5/30* (2006.01)
*B41J 9/44* (2006.01)
*G06F 11/00* (2006.01)

(52) U.S. Cl. ............................ 400/61; 400/76; 400/582

(58) Field of Classification Search .................... 400/60, 400/61, 70, 76, 578, 615.2, 708
See application file for complete search history.

(56) References Cited

U.S. PATENT DOCUMENTS 5,253,334 A 10/1993 Kimura et al.
5,562,353 A * 10/1996 Handa et al. ............... 400/615.2
5,649,775 A * 7/1997 Sakuragi et al. ........... 400/615.2
5,854,884 A * 12/1998 Watanabe et al. ............ 358/1.11
5,902,051 A 5/1999 Watanabe et al.
5,967,679 A * 10/1999 Beadman et al. .......... 400/615.2
5,980,133 A * 11/1999 Nunokawa et al. ............. 400/61
6,106,170 A 8/2000 Watanabe et al.
6,149,325 A 11/2000 Nunokawa et al.
7,503,711 B2 * 3/2009 Arkin ............................. 400/61
2002/0015167 A1 2/2002 Watanabe et al.

FOREIGN PATENT DOCUMENTS

EP 0661649 A2 12/1994
EP 1559562 A2 10/2003
EP 1946934 A1 1/2008
JP 5177905 7/1993
JP 7-81174 A 3/1995
JP 7285244 10/1995
JP 10-138570 A 5/1998
JP 2005-53183 A 3/2005

* cited by examiner

*Primary Examiner* — Daniel J Colilla
*Assistant Examiner* — Marissa Ferguson Samreth
(74) *Attorney, Agent, or Firm* — Day Pitney LLP

(57) ABSTRACT

A printer includes a feeding device that feeds a tape-like print medium along a length direction of the print medium and a printing device that prints a character on the print medium. The printer further includes a storage device that stores original data including unit data, line feed data, and line height data. The printer also includes a tape width detecting device that detects a tape width. Further, the printer includes a maximum number of lines calculating device that calculates a maximum number of lines that can be accommodated within the tape width when the height of the line is unchanged, and a print data generating device that generates print data corresponding to the maximum number of lines from the original data, and a printing control device that controls the printing device based on the print data.

10 Claims, 15 Drawing Sheets

PRINTER

CROSS-REFERENCE TO RELATED APPLICATION

This application claims priority from Japanese Patent Application No. 2007-11063, filed Jan. 22, 2007, the disclosure of which is hereby incorporated by reference in its entirety.

BACKGROUND

The present disclosure relates to a printer that includes a feeding device for feeding a tape-like print medium and a printing device for printing characters such as letters, numerals, symbols, and the like on the print medium.

Conventionally, there has been known a tape printer for printing letters, numerals, symbols and the like (hereinafter collectively referred to as "characters" unless specified otherwise) on a tape made of paper or plastic film with a print head. For example, the printer described in Japanese Patent Application Laid-Open No. Hei 5-177905 can print characters over plural lines depending on the width of the tape. Further, in this printer, at least one character may be specified as a single block, and several blocks may be printed in line along the length direction of the tape. In such a case, a block may include several lines of characters. Line feed and block separation may be specified with respective function keys provided on a keyboard of the printer.

After print dot pattern data for the characters or the blocks is generated and then stored, sometimes, the tape as a print medium may be replaced with another tape having a different width. In such a case, in the above-described conventional tape printer, arrangement of the characters or the blocks for printing is not changed unless otherwise specified by a user and the size of the characters or the blocks is enlarged or reduced corresponding to the tape width.

However, if the size of the characters or the blocks is automatically changed corresponding to the tape width as described above, an unexpected print result may be obtained, thereby sometimes wasting the tape. In particular, if the tape is replaced with another tape with a smaller tape width, there may be a problem that the characters may be illegible because the size of the characters or the blocks is changed to a smaller size. If the user wants the previously set size of the characters or the blocks to be maintained, the user needs to reedit the data after the tape is replaced. Thus, when the tape width is changed frequently, in particular, the user needs to reedit the data each time it is changed, which requires time and labor.

SUMMARY

Various exemplary embodiments of the broad principles herein provide a printer that can change arrangement of characters or blocks when the characters or the blocks are printed on a tape-like print medium, corresponding to a tape width without changing an initially set size of the characters or the blocks.

Exemplary embodiments provide a printer that includes a feeding device that feeds a tape-like print medium along a length direction of the print medium, a printing device that prints a character on the print medium, a storage device that stores original data including unit data, line feed data, and line height data, the unit data being data of a unit including at least one character, the line feed data specifying a separation position of a line of at least one unit to be printed on the print medium along the length direction, and the line height data indicating a height of the line of the at least one unit, a tape width detecting device that detects a tape width, the tape width being a width of the print medium in a direction perpendicular to the length direction, a maximum number of lines calculating device that calculates a maximum number of lines based on the line height data stored in the storage device and the tape width detected by the tape width detecting device, the maximum number of lines being a maximum number of lines that can be accommodated within the tape width when the height of the line of the at least one unit is unchanged, a print data generating device that generates print data corresponding to the maximum number of lines calculated by the maximum number of lines calculating device from the original data stored in the storage device, and a printing control device that controls the printing device based on the print data generated by the print data generating device.

Exemplary embodiments also provide a computer-readable recording medium storing a print control program for a printer, the printer having a feeding device that feeds a tape-like print medium along a length direction of the print medium and a printing device that prints a character on the print medium. The print control program includes instructions for acquiring original data including unit data, line feed data, and line height data, the unit data being data of a unit including at least one character, the line feed data specifying a separation position of a line of at least one unit to be printed on the print medium along the length direction, and the line height data indicating a height of the line of the at least one unit, instructions for detecting a tape width, the tape width being a width of the print medium in a direction perpendicular to the length direction, instructions for calculating a maximum number of lines based on the acquired line height data and the detected tape width, the maximum number of lines being a maximum number of lines that can be accommodated within the tape width when the height of the line of the at least one unit is unchanged, instructions for generating print data corresponding to the calculated maximum number of lines from the acquired original data, and instructions for controlling drive of the printing device of the printer based on the generated print data.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

Hereinafter, a tape printer 1 according to an embodiment of the present invention will be described with reference to the accompanying drawings. The drawings are used for describing technical features that can be adopted and the structures of the apparatus and flowcharts for respective processings are not intended to limit the invention to the particular structures or processings but are mere examples for description.

Figure 1:
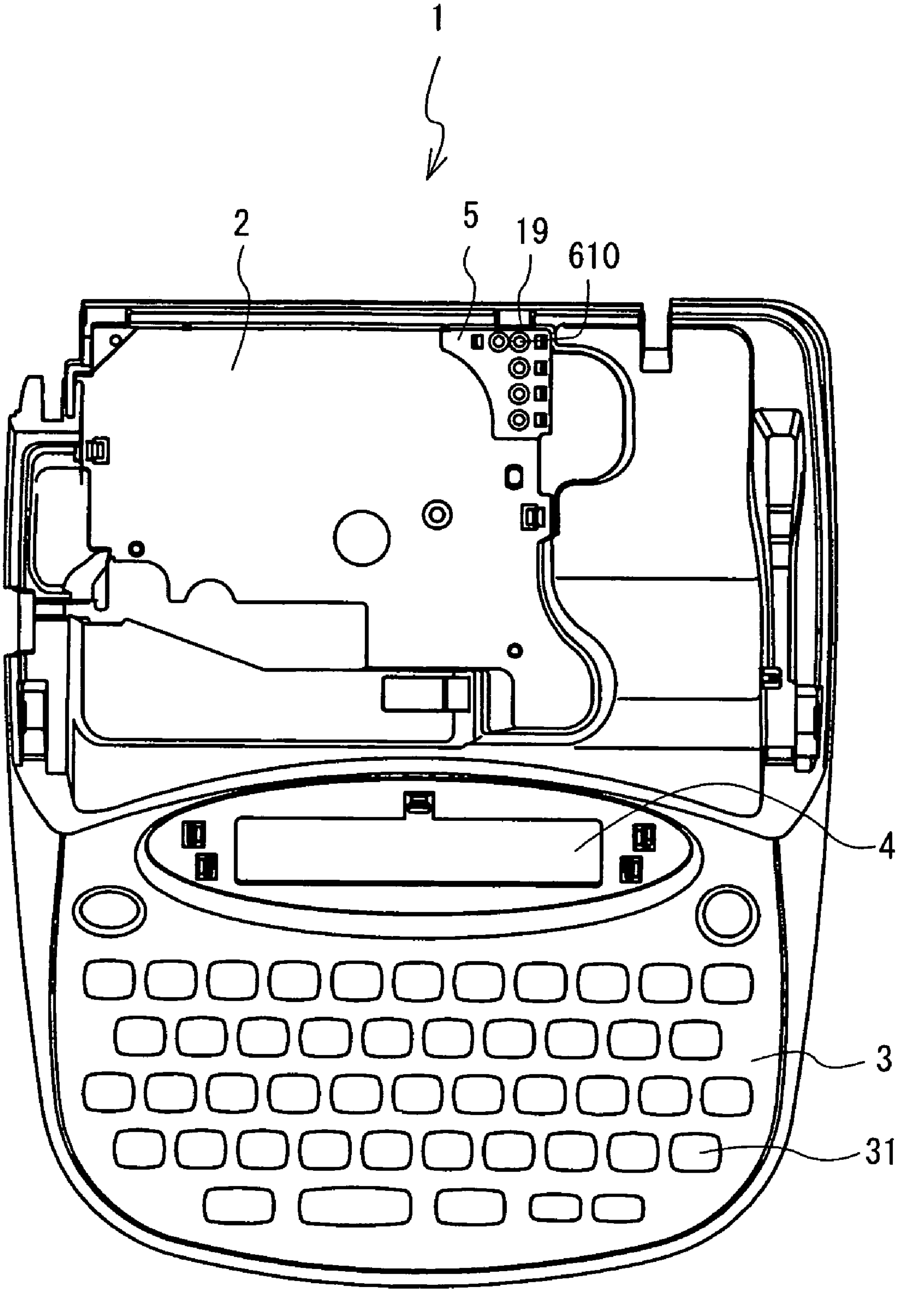
FIG. 1 is a plan view of a tape printer showing a state in which a lid of a tape cassette storage portion of the tape printer is removed.

First, the physical structure of the tape printer 1 will be described with reference to FIG. 1. As shown in FIG. 1, the tape printer 1 has a tape cassette storage portion 2 at its rear portion (top portion in FIG. 1) and a keyboard 3 at the front portion (bottom portion in FIG. 1). The tape cassette storage portion 2 is configured to store a tape cassette 51 (see FIG. 2) A plurality of keys 31 are arranged on the keyboard 3. The keys 31 include character keys, a line feed key, a block separation key, a conversion key and function keys. The character keys may be used to input letters (e.g. alphabets, Japanese HIRAGANA letters, and Japanese KATAKANA letters), numerals, and symbols. The line feed key may be used to specify line feed. The block separation key may be used to specify block separation. The function keys are used to input various function commands for, for example, setting print format, inputting document data, executing printing. Further, the tape printer 1 has a liquid crystal display unit 4 between the tape cassette storage portion 2 and the keyboard 3, on which characters input through the keys 31 on the keyboard 3 are displayed.

The tape printer 1 has a cassette detection portion 5 in a corner in the tape cassette storage portion 2 (right top corner in FIG. 1). The cassette detection portion 5 is provided with plural holes 19, and plungers 610 of respective detection switches 6 (see FIG. 4) provided on a detection sensor substrate 80 (see FIG. 4) protrude from the respective holes 19. The detection switches 6 can detect a type of a tape cassette 51 stored in the tape cassette storage portion 2 in combination with identification holes 661 of the tape cassette 51 as described later.

Figure 2:
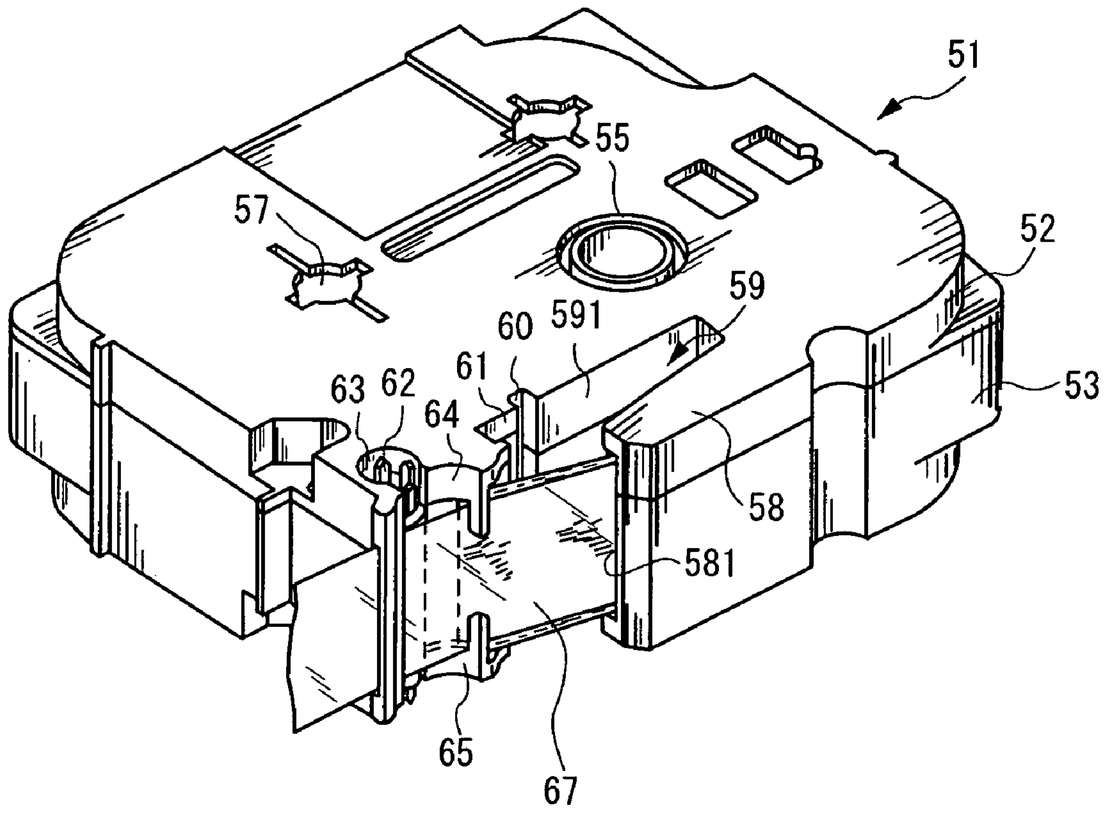
FIG. 2 is a perspective view of the tape cassette.
Figure 3:
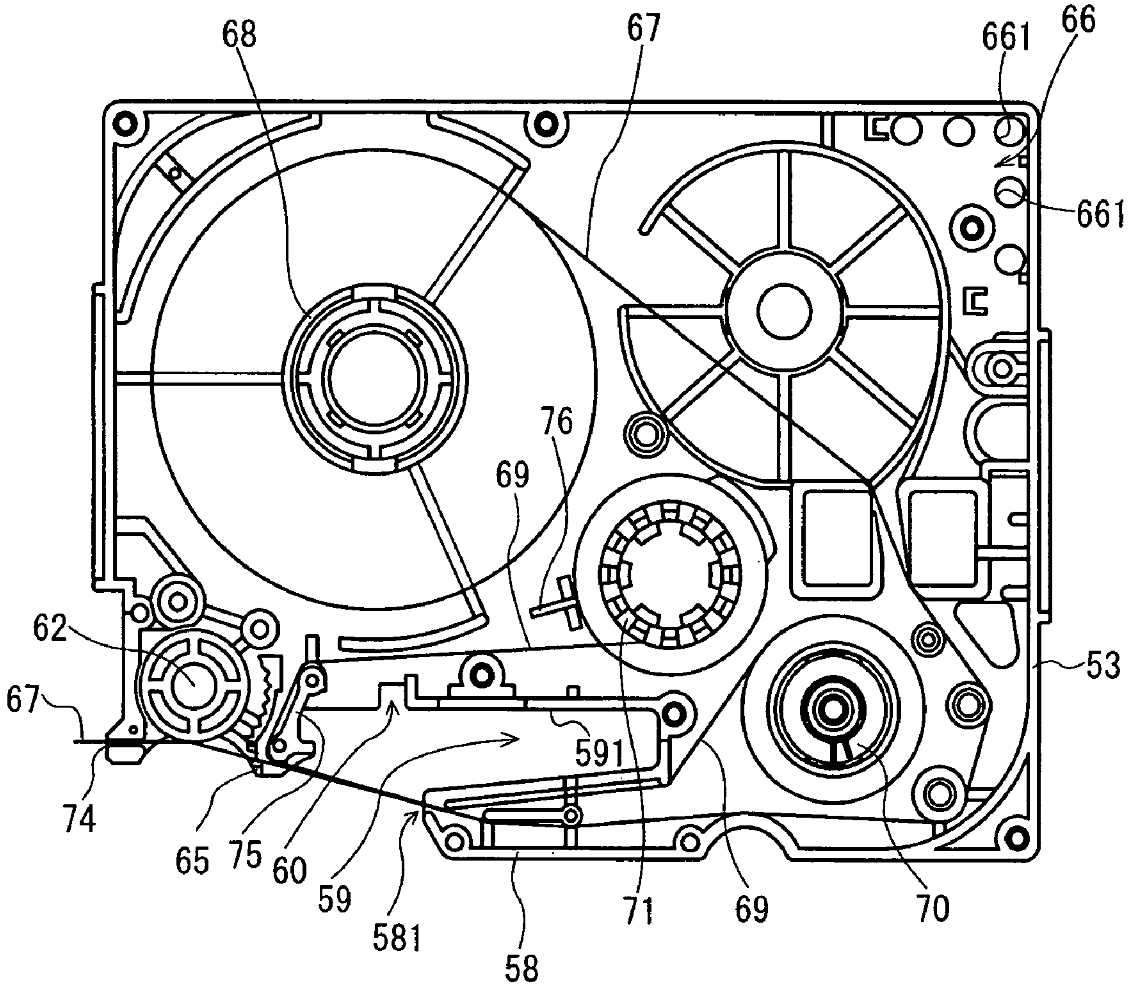
FIG. 3 is a plan view of a lower case in a state in which an upper case is removed.

The physical structure of the tape cassette 51 to be loaded in the tape cassette storage portion 2 of the tape printer 1 will be described with reference to FIGS. 2 and 3. As shown in FIG. 2, the tape cassette 51 includes an upper case 52 and a lower case 53. The tape cassette 51 has supporting holes 57 and 55 that rotatably support a tape spool 68 (see FIG. 3) and a ribbon take-up spool 71 (see FIG. 3), respectively. Although FIG. 2. only represents the respective supporting holes 55 and 57 formed in the upper case 52, the lower case 53 also has supporting holes facing the respective supporting holes 55 and 57 in the upper case 52.

As shown in FIG. 2, an arm portion 58 is provided at the front side (right top side in FIG. 2) of the tape cassette 51. The arm portion 58 guides a print tape 67 pulled out from the tape spool 68 and an ink ribbon 69 pulled out from a ribbon spool 70 and send them out from an opening portion 581. The print tape 67, the tape spool 68, the ink ribbon 69, and the ribbon spool 70 will be described later with reference to FIG. 3.

A head mounting portion 59, into which a thermal head (not shown) of the tape printer 1 is to be placed, is provided in the back of the arm portion 58. In the head mounting portion 59, a first fitting portion 60 is formed in a wall portion 591 facing the arm portion 58 such that it is dented backward of the tape cassette 51 (upward on the left side in FIG. 2). A second fitting portion 61 is formed in the left side wall of the head mounting portion 59 such that it is dented in a direction perpendicular to the first fitting portion 60 (the direction along the wall portion 591). Two projecting portions formed on a head holder (not shown) for supporting the thermal head are fitted into the first fitting portion 60 and the second fitting portion 61. With such a structure, the thermal head can be securely placed in the head mounting portion 59 without interference with the print tape 67 and the ink ribbon 69.

A supporting hole 63 is provided downstream of the head mounting portion 59 with respect to a feeding direction of the print tape 67 and the ink ribbon 69. The supporting hole 63 rotatably supports a tape feeding roller 62. The tape feeding roller 62 pulls out the print tape 67 from the tape spool 68 in cooperation with a pressure roller (not shown) facing the tape feeding roller 62. A pair of restricting members 64 and 65 (an upper member 64 and a lower member 65) are provided in the vicinity of the tape feeding roller 62. The restricting members 64 and 65 restrict the print tape 67 in the tape width direction when the print tape 67, on which letters are printed, is fed downstream of the thermal head.

Next, the internal configuration of the tape cassette 51 will be described with reference to FIG. 3. As shown in FIG. 3, the tape spool 68 is disposed at the rear portion (upper portion in FIG. 3) in the lower case 53 such that it can be rotated around the supporting hole 57 described above. The print tape 67 is wound on the tape spool 68 with its separation sheet facing outward. The ribbon spool 70, on which the ink ribbon 69 is wound, is rotatably disposed at the front portion (lower portion in the FIG. 3) in the lower case 53. A ribbon take-up spool 71 is disposed between the tape spool 68 and the ribbon spool 70 such that it can be rotated around the supporting hole 55 described above. The ribbon take-up spool 71 pulls out the ink ribbon 69 from the ribbon spool 70 and takes up the ink ribbon 69 that has been used for printing characters.

The print tape 67 is pulled out from the tape spool 68 by cooperation of the tape feeding roller 62 provided in the downstream of the head mounting portion 59 and the pressure roller (not shown) provided on the tape printer 1. The pulled out print tape 67 comes out of an opening 581 in the arm portion 58, passes the front side (lower side in FIG. 3) of the head mounting portion 59, then passes between the restricting members 64 and 65 (see FIG. 2) and finally is discharged out of the tape cassette 51 through a tape discharge portion 74. The ink ribbon 69 is pulled out from the ribbon spool 70 by the ribbon take-up spool 71. The pulled out ink ribbon 69 comes out of the opening 581 in the arm portion 58, passes the front side of the head mounting portion 59, is guided by a guide portion 75 formed inside the restricting members 64 and 65 and then taken up around the ribbon take-up spool 71. A clutch spring 76 is provided at the bottom of the ribbon take-up spool 71 in order to prevent the ribbon take-up spool 71 from being inversely rotated to loosen the taken-up ink ribbon 69.

An identification portion 66 is formed at the right rear corner portion of the lower case 53, which makes contact with the cassette detection portion 5 when the tape cassette 51 is loaded into the tape cassette storage portion 2 of the tape printer 1. A plurality of identification holes 661 for detecting the type of the tape cassette 51 are provided in the identification portion 66. The type of the tape cassette 51 includes, for example, the width of the print tape 67 accommodated in the tape cassette 51, whether the print tape 67 is of receptor type or laminate type, and whether or not the print tape 67 can be recycled.

Figure 4:
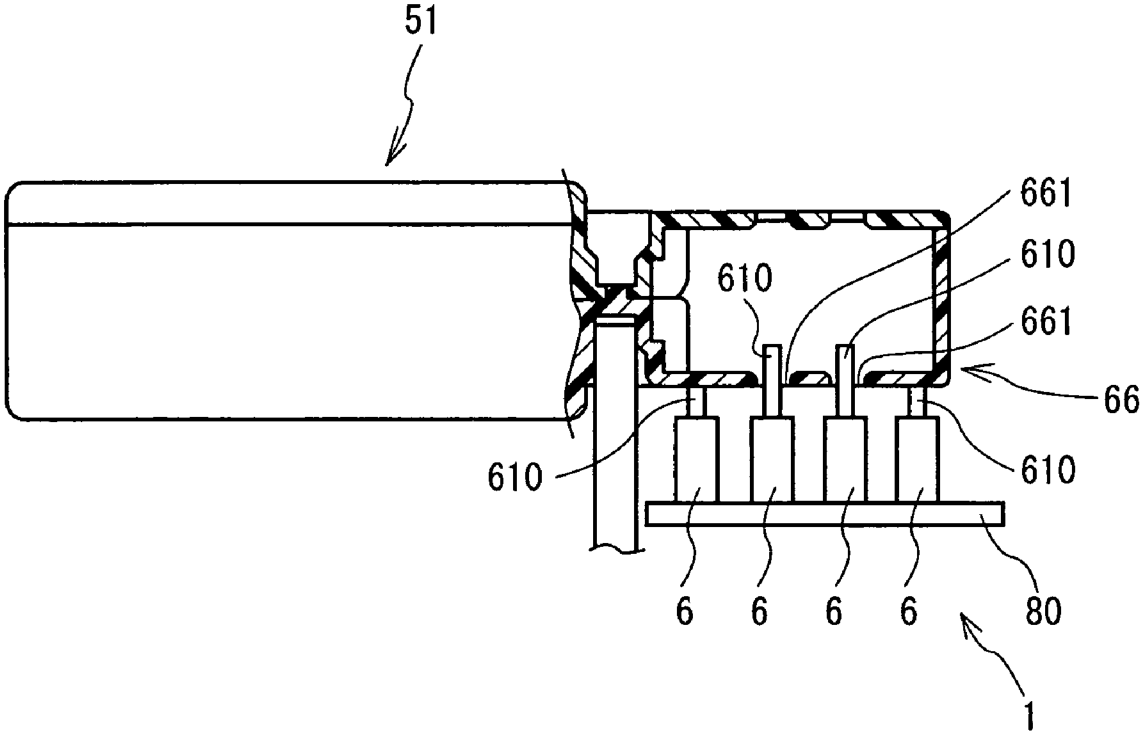
FIG. 4 is an explanatory diagram showing the relationship between a detection switch of a cassette detecting portion and identification holes in an identification portion.

Next, how the type of the tape cassette 51 is detected with the cassette detection portion 5 of the tape printer 1 and the identification portion 66 of the tape cassette 51 will be described with reference to FIG. 4. The formation pattern of the identification holes 661 formed in the identification portion 66 differs depending on the type of the tape cassette 51. The plungers 610 of the detection switches 6 disposed in the cassette detection portion 5 of the tape printer 1 can be inserted into the respective identification holes 661. When the detection switch 6 faces the corresponding identification hole 661, like the second detection switch 6 from the left in FIG. 4, remains off. On the other hand, when the detection switch 6 faces a portion in which no identification hole 661 is formed, like the leftmost detection switch 6 in FIG. 4, its plunger 610 is pressed down by the substrate of the identification portion 66, and the detection switch 6 is turned on. The type of the tape cassette 51 can be detected based on a combination of ON/OFF signals from the detection switches 6. In this embodiment, of the five detection switches 6, two detection switches 6 are used for detection of the tape width. More specifically, four types of the tape widths, 12 mm, 18 mm, 24 mm, and 36 mm can be detected corresponding to the combinations of OFF/OFF, OFF/ON, ON/OFF, ON/ON.

Figure 5:
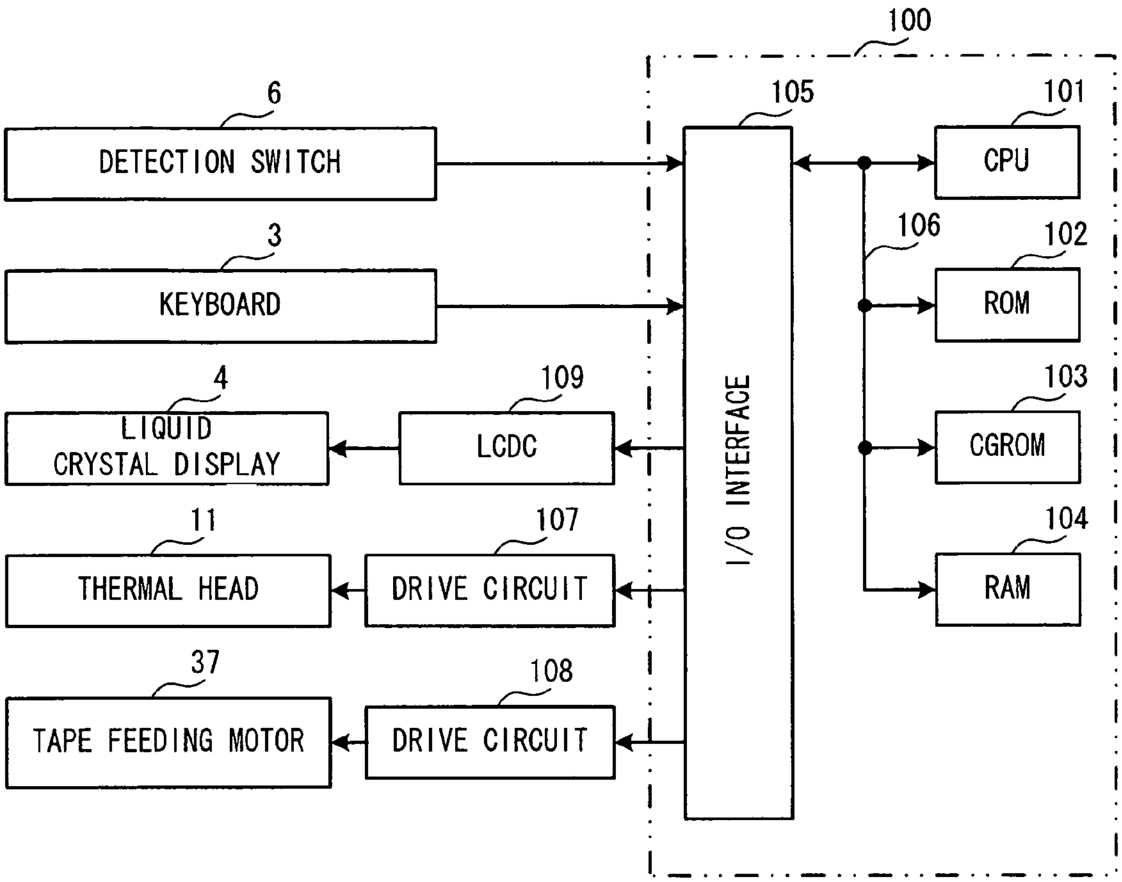
FIG. 5 is a block diagram showing an electric configuration of the tape printer.

Next, the electric configuration of the tape printer 1 will be described with reference to FIGS. 5-7. As shown in FIG. 5, the control system of the tape printer 1 is built up around a control circuit unit 100 formed on a control board as the core. The control circuit unit 100 includes CPU 101 for controlling respective devices, ROM 102, CGROM 103, RAM 104 and I/O interface 105, which are interconnected through bus 106.

The CGROM 103 stores dot pattern data for display being associated with corresponding code data, for each of a large number of characters. The detail of the ROM 102 and the RAM 104 will be described later.

The keyboard 3, the detection switch 6, a liquid crystal display controller (hereinafter referred to as LCDC) 109, drive circuits 107 and 108 are connected to the I/O interface 105. The LCDC 109 includes a video RAM (not shown) for outputting display data to the liquid crystal display unit 4. The drive circuits 107 and 108 drive the thermal head 11 and the tape feeding motor 37, respectively.

Figure 6:
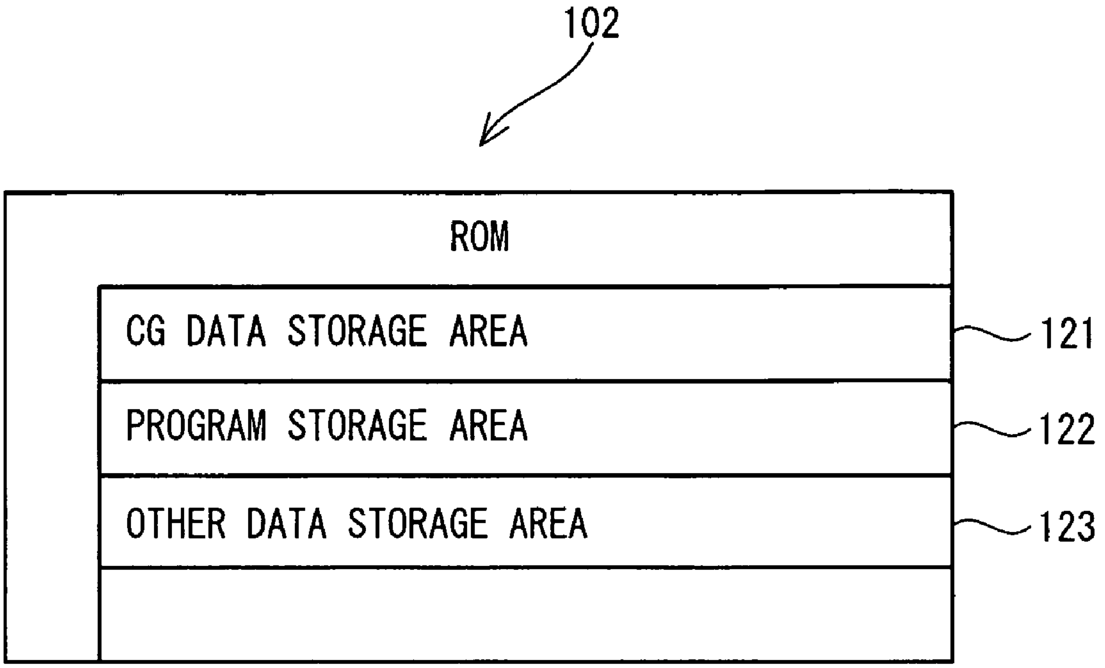
FIG. 6 is an explanatory diagram of a configuration of ROM.

As shown in FIG. 6, the ROM 102 includes CG data storage area 121, program storage area 122 and other data storage area 123. The CG data storage area 121 stores print dot pattern data being associated with corresponding code data, for each of characters such as alphabets, Kanji letters, HIRAGANA letters, KATAKANA letters, numerals, and symbols. The print dot pattern data is classified by font (Gothic style, Mincho style etc.) and the stored print dot pattern data for each font includes data for six print character sizes (16, 24, 32, 48, 64, 96 dots). CG data storage area 121 also stores graphic pattern data for printing graphic images. The program storage area 122 stores various kinds of programs for controlling the tape printer 1. The programs include a display drive control program, a print drive control program, and a tape print control program. The display drive control program controls the LCDC 109 in response to the code data of characters inputted through the keyboard 3. The print drive control program successively reads data stored in the print buffer 143 (see FIG. 7) and controls drive of the thermal head 11 and the tape feeding motor 37. The tape print control program adjusts the number of lines of characters or blocks to be printed, depending on the tape width of the print tape 67. The CPU 101 executes various kinds of arithmetic operations based on these and other programs stored in the ROM 102.

Figure 7:
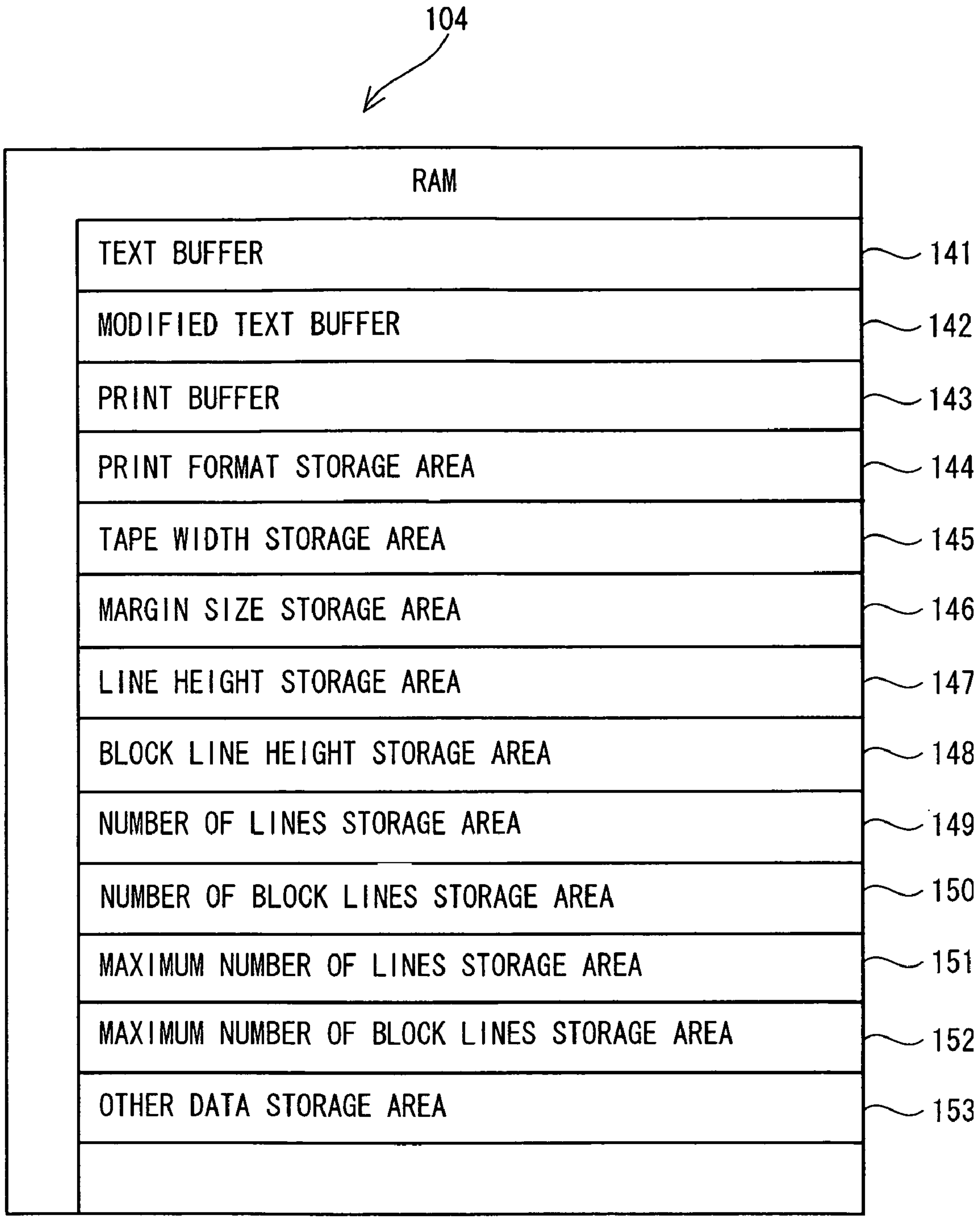
FIG. 7 is an explanatory diagram of a configuration of RAM.

As shown in FIG. 7, the RAM 104 includes text buffer 141, modified text buffer 142, print buffer 143, print format storage area 144, tape width storage area 145, margin size storage area 146, line height storage area 147, block line height storage area 148, number of lines storage area 149, number of block lines storage area 150, maximum number of lines storage area 151, maximum number of block lines storage area 152, and other data storage area 153. The text buffer 141 stores code data for characters, line feed, block separation etc. inputted through the keyboard 3 as document data. The modified text buffer 142 stores document data that has been modified based on the tape width of the print tape 67 in a print control processing to be described later. The print buffer 143 stores print dot patterns of characters, number of pulses to be applied, which corresponds to formation energy for each dot, and the like as print data. Printing by the thermal head 11 can be carried out according to the print data stored in the print buffer 143. The print format storage area 144 stores print format information, such as set character size data and font data. As regards the character size, if a size is specified by a user, the specified size is stored. On the other hand, if a size is not specified by a user, an allocated size is automatically stored. The allocated size is set such that the character occupies a printable area in a tape width direction of the print tape 67 to the fullest extent. The tape width direction hereinafter refers to a direction perpendicular to the feeding direction of the print tape 67.

The tape width storage area 145 stores a tape width of the print tape 67 detected by the aforementioned detection switches 6. The margin size storage area 146 stores set sizes of various kinds of margins. The margins include a front margin, a rear margin, an upper/lower margin, a margin between lines, and a margin between blocks. The front margin herein means a margin provided in front of a print start position in the feeding direction of the print tape 67. The rear margin herein means a margin provided following a print termination position in the feeding direction of the print tape 67. The upper/lower margin herein means a margin provided at both ends of the print tape 67 in the tape width direction. The margin between lines herein means a margin provided between lines or block lines each time when a line of characters or blocks aligned in the feeding direction of the print tape 67 is fed to begin a new line. The margin between blocks herein means a margin provided between blocks. In the exemplary embodiment, an alignment of characters along the feeding direction of the print tape 67 is referred to as a "line" and feeding of a line to begin a new line is referred to as "line feed". An alignment of blocks along the feeding direction of the print tape 67 is referred to as a "block line". Each of the blocks includes at least one character, and the blocks can be separated from one another by a block separation code in between. Feeding of the block line to begin a new block line is referred to as "block line feed" (see FIG. 12). The number of lines storage area 149 and the number of block lines storage area 150 respectively store a number of the lines and a number of the block lines of the document data. The maximum number of lines storage area 151 and the maximum number of block lines storage area 152 respectively store a maximum number of the lines and a maximum number of the block lines that can be arranged within the tape width. The maximum numbers of the lines and block lines are calculated in the tape print control processing, which will be described later.

Figure 8:
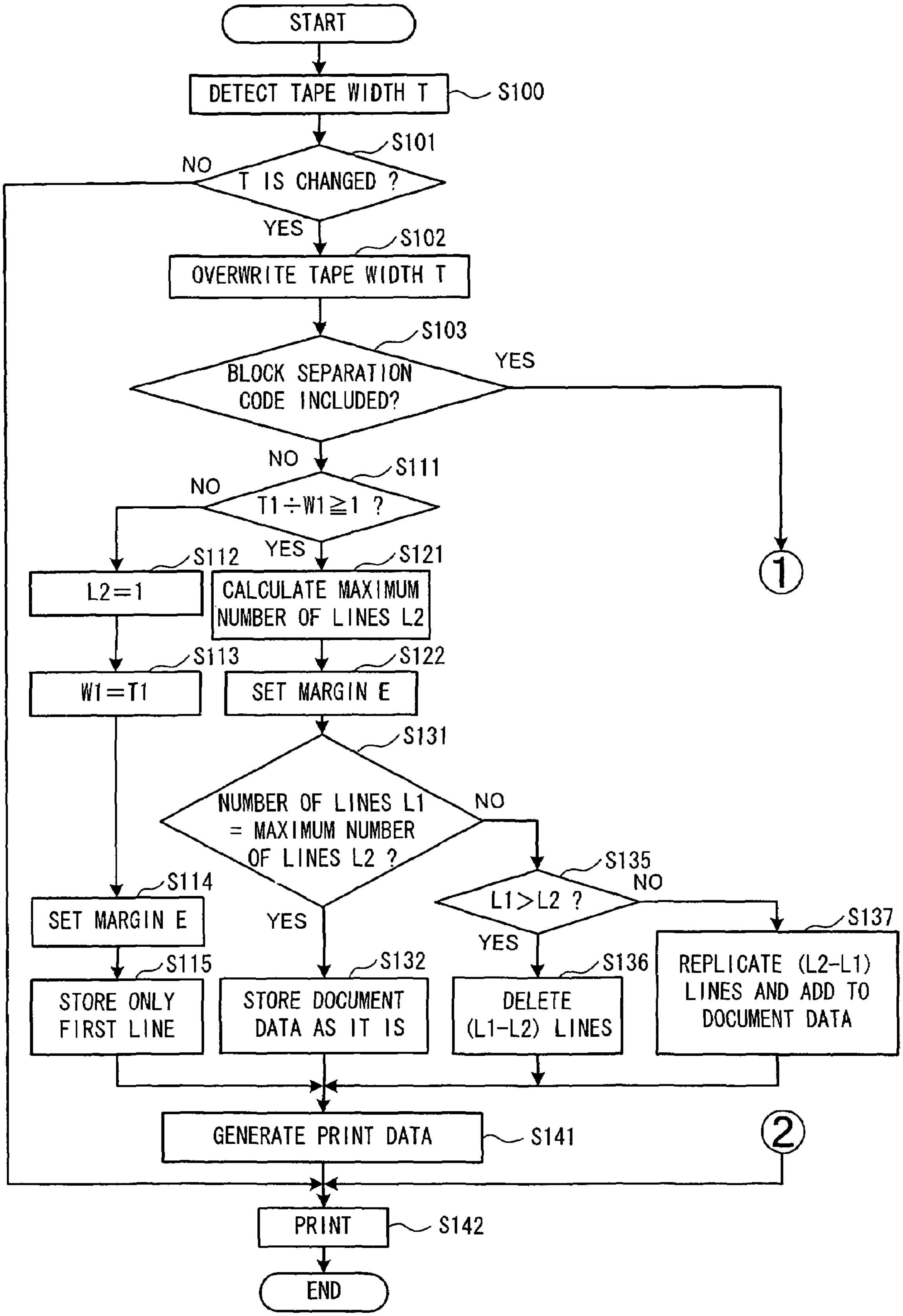
FIG. 8 is a flowchart of tape print control processing of the tape printer.

Next, tape print control processing of the tape printer 1 will be described with reference to FIGS. 8-15. The tape print control processing shown in FIG. 8 is carried out after a character or a block as a print object is inputted through the keyboard 3 by a user, and a print format (character size, font, etc.), sizes of respective margins, and the like are set up. Accordingly, before start of the tape print control processing, document data of the inputted character or block is stored in the text buffer 141 of the RAM 104, print format information including character size and font is stored in the print format storage area 144, and various margin data is stored in the margin size storage area 146. The tape width of the print tape 67 accommodated in the tape cassette 51 loaded in the tape printer 1 upon initial setting is detected based on a combination of ON/OFF signals from the two detection switches 6 as described above and stored in the tape width storage area 145. Further, the print data generated based on these data according to any known method is stored in the print buffer 143.

Figure 10:
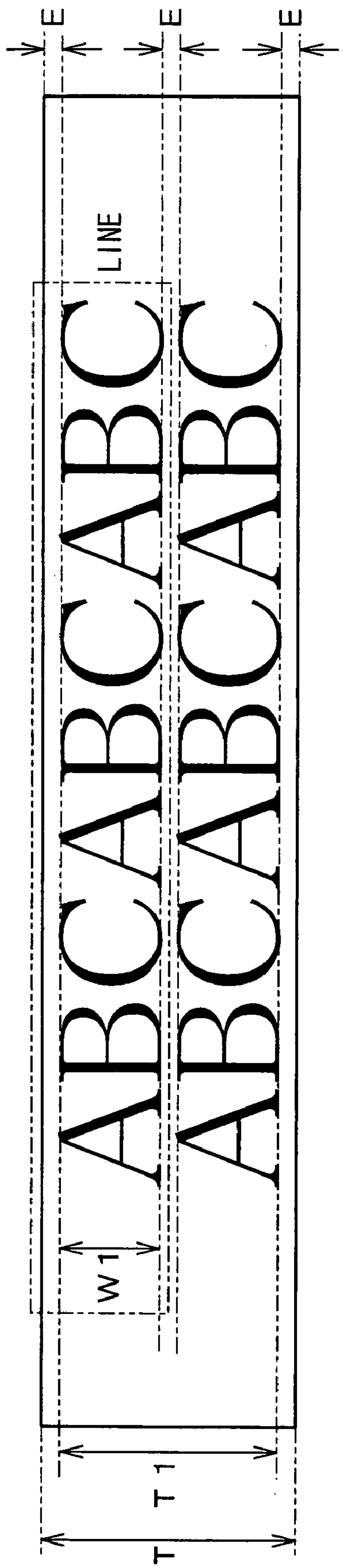
FIG. 10 is an explanatory diagram of an example of two lines of characters printed on a print tape.
Figure 14:
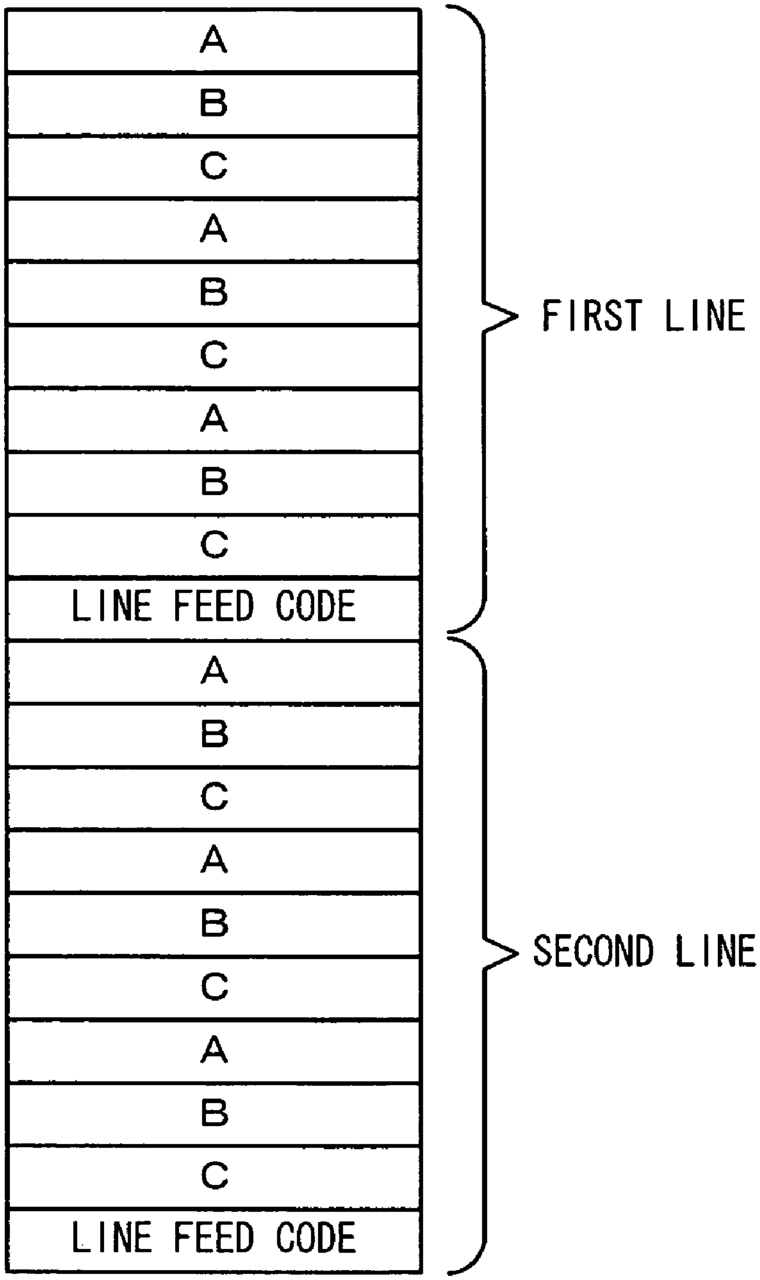
FIG. 14 is an explanatory diagram of document data for the example shown in FIG. 10.

In an example of printed characters shown in FIG. 10, two lines are printed on the print tape 67 having a tape width of 24 mm. Each of the two lines consists of alphabets "ABCABCABC". In FIG. 10, T indicates the tape width, T1 indicates the printable height (the height of the printable area), W1 indicates the line height, and E indicates the margin height of the upper/lower margin and of the margin between the lines. When the data of the example shown in FIG. 10 has been set up, document data of the first and second lines shown in FIG. 14 is stored in the text buffer 141. The document data consists of data of the first and second lines in succession. The data of each line consists of successive data of the alphabets "ABCABCABC" and a line feed code inserted at a separation position of the line. The line feed code can be inputted through the line feed key on the keyboard 3. Although the alphabets are shown as they are in FIG. 14, the actual data stored in the text buffer 141 is code data of these characters. The character size and the font (Mincho style) of the alphabets "ABCABCABC" is stored in the print format storage area 144. The tape width "T" is stored in the tape width storage area 145. The margin height "E" is stored in the margin size storage area 146 as the size data of the upper/lower margin and of the margin between the lines.

Figure 12:
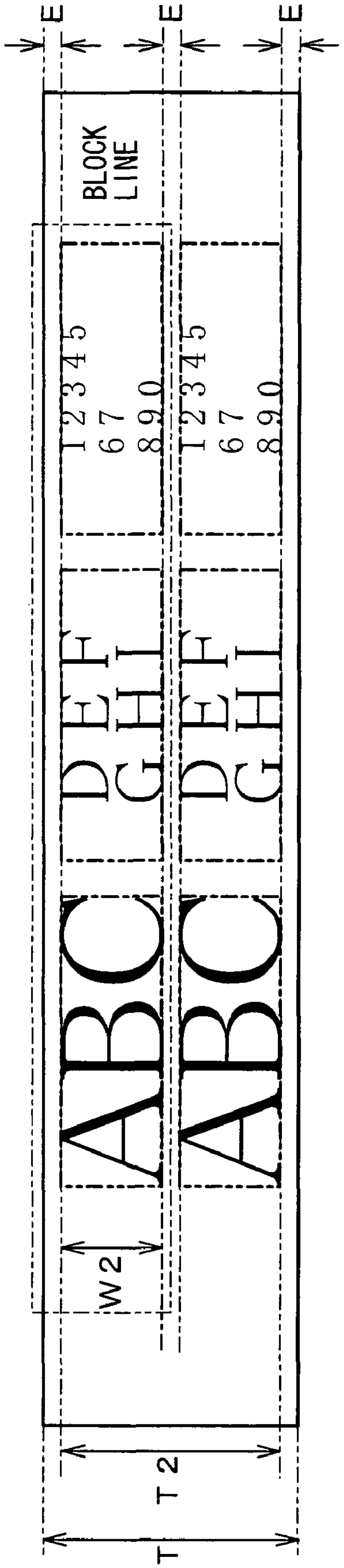
FIG. 12 is an explanatory diagram of an example of two block lines of blocks printed on a print tape.
Figure 15:
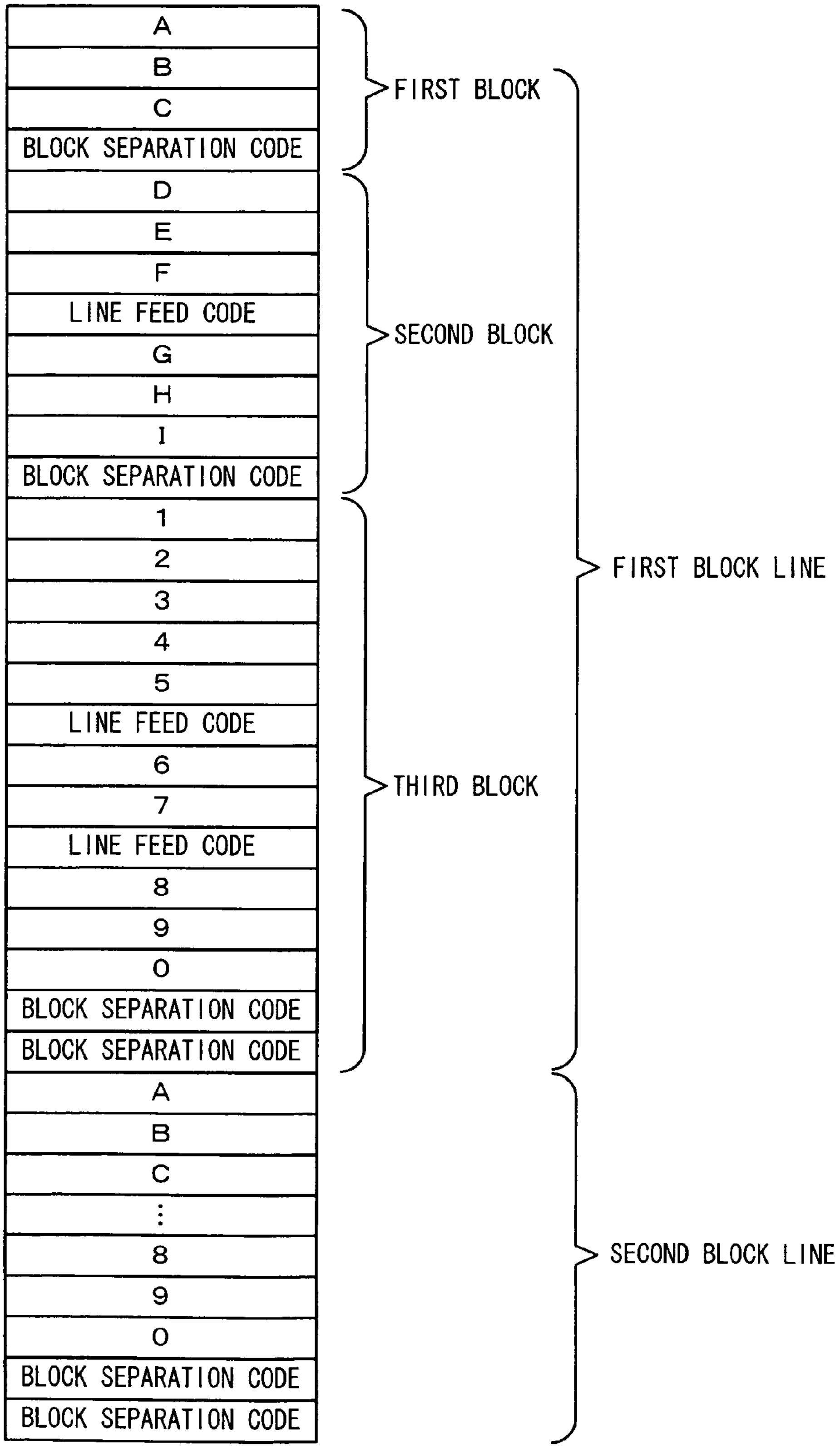
FIG. 15 is an explanatory diagram of document data for the example shown in FIG. 12.

In another example shown in FIG. 12, two block lines are printed on the print tape 67 having a tape width of 24 mm. Each of the two block lines consists of three blocks, that is, a first block having alphabets "ABC", a second block having alphabets "DEFGHI", and a third block having numerals "1234567890". In FIG. 12, T indicates the tape width, T2 indicates the printable height, W2 indicates the block line height, and E indicates the margin height. When data of the example shown in FIG. 12 has been set up, document data of the first and the second block lines shown in FIG. 15 is stored in the text buffer 141. The document data consists of data of the first and the second block lines in succession. The data of each block line consists of data of the first block, the second block, the third block, three block separation codes inserted at respective separation positions of the blocks, and another block separation code at the end. Accordingly, two successive block separation codes, each of which can be inputted through the block separation key on the keyboard 3, exist at the end of the data of each block line. In the exemplary embodiment, the two successive block separation codes are regarded as a block line feed code for specifying a separation position of the block line. Further, when a block is constituted of a plurality of lines of one or more characters, the data of the block is constituted of character code data and line feed code data inserted at the separating position of each line, as in the second and the third blocks. The character size and font (Mincho style) of the blocks are stored in the print format storage area 144. "T" is stored in the tape width storage area 145. "E" is stored in the margin size storage area 146 as size data of the upper/lower margin and margin between block lines.

With various data thus stored as the initial setting, when the function key "execute printing" provided on the keyboard 3 of the tape printer 1 is pressed, the tape print control processing of FIG. 8 is started. First, the CPU 101 detects a tape width T of the print tape 67 in the currently loaded tape cassette 51, based on a combination of ON/OFF signals from the two detection switches 6 (S100). The CPU 101 determines whether a tape width T is changed from a stored tape width T, referring to the tape width storage area 145 of the RAM 104 (S101) If the tape width T is not changed (S101: NO), printing operation can be executed according to the initial setting without problems. Consequently, the CPU 101 drives the thermal head 11 and the tape feeding motor 37 through the drive circuits 107 and 108, based on the print data stored in the print buffer 143, thereby printing characters or blocks on the print tape 67 with the thermal head 11 (S142). Then, the processing is terminated.

For example, while a tape width T stored in the tape width storage area 145 is 24 mm, ON signals may be detected from both of the two detection switches 6. In such a case, the tape width T of the print tape 67 in the currently loaded tape cassette 51 is detected as 36 mm, and the CPU 101 determines that the tape width T is changed (S101: YES) and overwrites the detected tape width T (36 mm) of the current print tape 67 on the tape width T (24 mm) stored in the tape width storage area 145 (S102). Next, it is determined whether a block separation code data is included in the stored document data, referring to the text buffer 141 (S103). As shown in FIG. 14, if the document data is constituted of only character code data and line feed code data and contains no block separation code data (S103: NO), it is determined whether a value obtained by dividing the printable height T1 by the line height W1 is 1 or more (S111). The printable height T1 can be calculated according to an equation T1=T−2E, using the tape width T stored in the tape width storage area 145 and the margin height E stored in the margin size storage area 146. The line height W1 can be calculated from the stored character size, referring to the print format storage area 144. The calculated line height W1 is stored in the line height storage area 147 of the RAM 104.

When the quotient of T1 divided by W1 is smaller than 1 (S111: NO), it means that the currently set line height W1 already exceeds the printable height T1 of the print tape 67. Therefore, if the line height W1 remains unchanged, no line can be printed. Then, the CPU 101 executes processing for adjusting the line height W1 to enable printing a single line. More specifically, a maximum number of lines L2, which is a maximum number of lines that can be accommodated within the tape width T, is set to 1, and L2 (=1) is stored in the maximum number of lines storage area 151 of the RAM 104 (S112). The line height W1 is then set to the printable height T1, and W1 (=T1) is stored in the line height storage area 147 of the RAM 104 (S113). Because the maximum number of lines L2 is 1, the margin height E of the upper/lower margin and the margin between the lines is set again such that the single line having the line height W1 (=T1) is disposed with equal spacing in the tape width direction (S114). More specifically, the margin height E is calculated according to an equation E=(T−W1)/2, using the tape width T stored in the tape width storage area 145 and the line height W1 stored in the line height storage area 147. At this time, the margin height E of the upper/lower margin and the margin between the lines stored in the margin size storage area 146 is overwritten with a newly calculated value. After that, of the document data stored in the text buffer 141 of the RAM 104, only data of the first line is extracted and stored as a modified document data in the modified text buffer 142 (S115). For example, when the document data shown in FIG. 14 is stored in the text buffer 141, "A, B, C, A, B, C, A, B, C, line feed code" (1st-10th lines in FIG. 14), which is the data of the first line, is stored in the modified text buffer 142.

If a value obtained by dividing the printable height T1 by the line height W1 is 1 or more (S111: YES), the CPU 101 calculates the maximum number of lines L2, referring to the tape width storage area 145, the margin size storage area 146, and the line height storage area 147 (S121). The calculated maximum number of lines L2 is stored in the maximum number of lines storage area 151 of the RAM 104. For example, the maximum number of lines L2 can be obtained according to an equation $L2=\text{floor}\{(T-W1)/(W1+E)\}$ using a floor function for obtaining a maximum integer equal to or less than a real number x. For example, if the tape width T is 36 mm, the line height W1 obtained from the character size is 8 mm, and the margin height E is 1 mm, $L2=\text{floor}\{(T-W1)/(W1+E)\}=\text{floor}\{(36-8)/(8+1)\}=3$ (lines) can be obtained.

After the maximum number of lines L2 is calculated (S121), the CPU 101 sets the margin height E of the upper/lower margin and the margin between the lines again such that the maximum number of lines L2 are disposed with equal spacing in the tape width direction (S122). More specifically, the margin height E is calculated according to an equation $E=(T-L2\cdot W1)/(L2+1)$, referring to the tape width storage area 145, the line height storage area 147 and the maximum number of lines storage area 151. At this time, the margin height E of the upper/lower margin and the margin between the lines stored in the margin size storage area 146 are overwritten with a newly calculated value. For example, when L2=3 (lines) is obtained as in the aforementioned example, $E=(36-3\times8)/(3+1)=3$ (mm) can be obtained.

After the margin E is set again (S122), the CPU 101 calculates a number of lines L1, which is the number of lines included in the document data stored in the text buffer 141, and determines whether the number of lines L1 is equal to the maximum number of lines L2 obtained in S121 (S131). More specifically, the number of lines L1 is obtained based on the number of the line feed codes contained in the document data stored in the text buffer 141, and the obtained number of lines L1 is compared with the maximum number of lines L2 stored in the maximum number of lines storage area 151. If the number of lines L1 is equal to the maximum number of lines L2 (S131: YES), the same number of lines (L1=L2) can be printed to fit within the tape width T. Therefore, the CPU 101 replicates the document data stored in the text buffer 141 as it is and stores it as a modified document data in the modified text buffer 142 (S132).

On the other hand, if the number of lines L1 is different from the maximum number of lines L2 (S131: NO), it is determined whether the number of lines L1 is larger than the maximum number of lines L2 (S135). If the number of lines L1 is larger than the maximum number of lines L2 (S135: YES), it means that the previously used print tape 67 has been replaced with another print tape having a smaller width. Thus, the number of lines needs to be reduced so that the characters with the currently set line height W1 can be accommodated within the tape width T. Thus, the CPU 101 modifies the document data stored in the text buffer 141 by deleting data corresponding to a number of lines (L1−L2) from the end, and stores the modified document data in the modified text buffer 142 (S136). For example, if the number of lines L1 contained in an initial document data is 2 (L1=2), that is, the number of the line feed codes is 2 as shown in FIG. 14, and the maximum number of lines L2 is calculated as 1 (L2=1) in S121, the data corresponding to one line, the number of which is obtained by L1−L2, is deleted from the end the document data. In the example of FIG. 14, "A, B, C, A, B, C, A, B, C, line feed code", which is the data of the second line (11th-20th lines in FIG. 14), is deleted and remaining data is stored in the modified text buffer 142 as the modified document data.

On the other hand, if the number of lines L1 is smaller than the maximum number of lines L2 (S135: NO), it means that the previously used print tape 67 has been replaced with another print tape having a larger width. Thus, the number of lines needs to be increased so that the characters with the currently set line height Wi can be printed to occupy the tape width T to the full extent. Therefore, the CPU 101 replicates data corresponding to the number of lines (L2−L1) from the beginning of the original document data stored in the text buffer 141. Then, document data in which data corresponding to the number of the replicated lines (L2−L1) is added after the end of the original document data is stored in the modified text buffer 142 as the modified document data (S137). For example, if L2=3 is obtained in the example of FIG. 14, L2−L1=1. Consequently, data of the first line (1st-10th lines in FIG. 14) "A, B, C, A, B, C, A, B, C, line feed code" is replicated and added just after the end of the data of the second line (after the 20th line in FIG. 14), and thus modified document data is stored.

Figure 11:
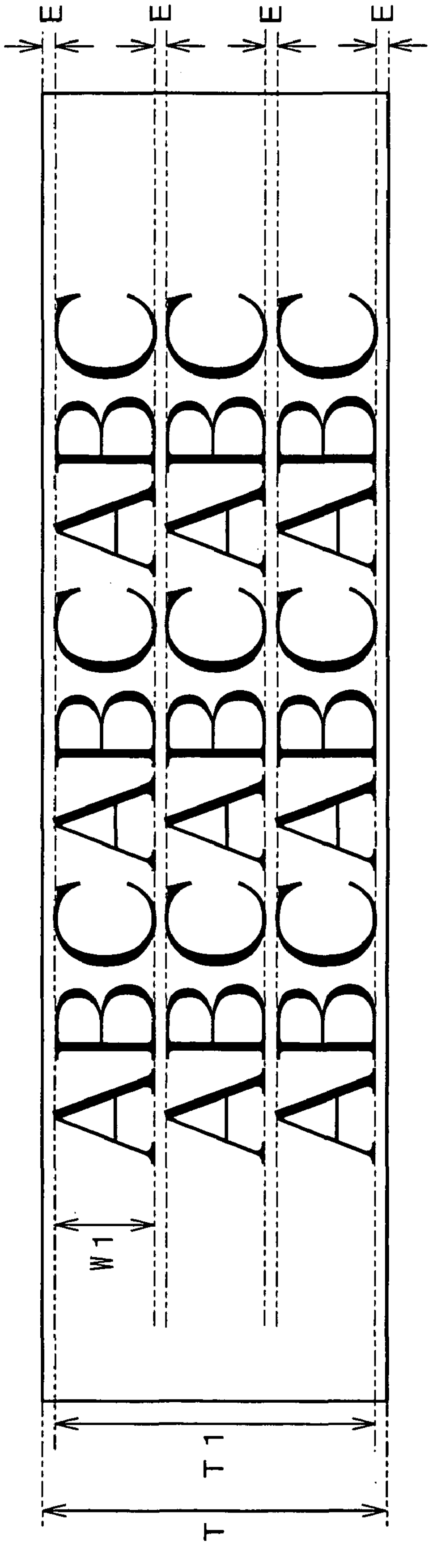
FIG. 11 is an explanatory diagram of an example of printing results of the characters of FIG. 10 after replacing the print tape with another print tape having a larger tape width.

As described above, the document data stored in the text buffer 141 is modified corresponding to the maximum number of lines L2, and the modified document data is stored in the modified text buffer 142 (S115, S132, S136, S137). After that, the CPU 101 generates print data by any known method for the document data corresponding to the L2 lines disposed in the tape width direction, based on the modified document data stored in the modified text buffer 142, and the margin height E of the upper/lower margin and the margin between the lines set in S114 or S122 and stored in the margin size storage area 146. The initial print data is overwritten with the generated print data in the print buffer 143 (S141). After that, the CPU 101 successively reads out the print data from the print buffer 143 and drives the thermal head 11 and the tape feeding motor 37 to print the characters on the print tape 67 (S142). Then, the processing is ended. In the example of the alphabets printed over two lines shown in FIG. 10, if the tape is replaced with another tape having a larger tape width T and then three lines are printed corresponding to the calculated maximum number of lines L2=3, a print result shown in FIG. 11 can be obtained. As shown in FIG. 11, the characters can be printed with the line height W1 unchanged, that is, character size unchanged, and with the margin height E adjusted corresponding to the maximum number of lines L2 (=3).

Figure 9:
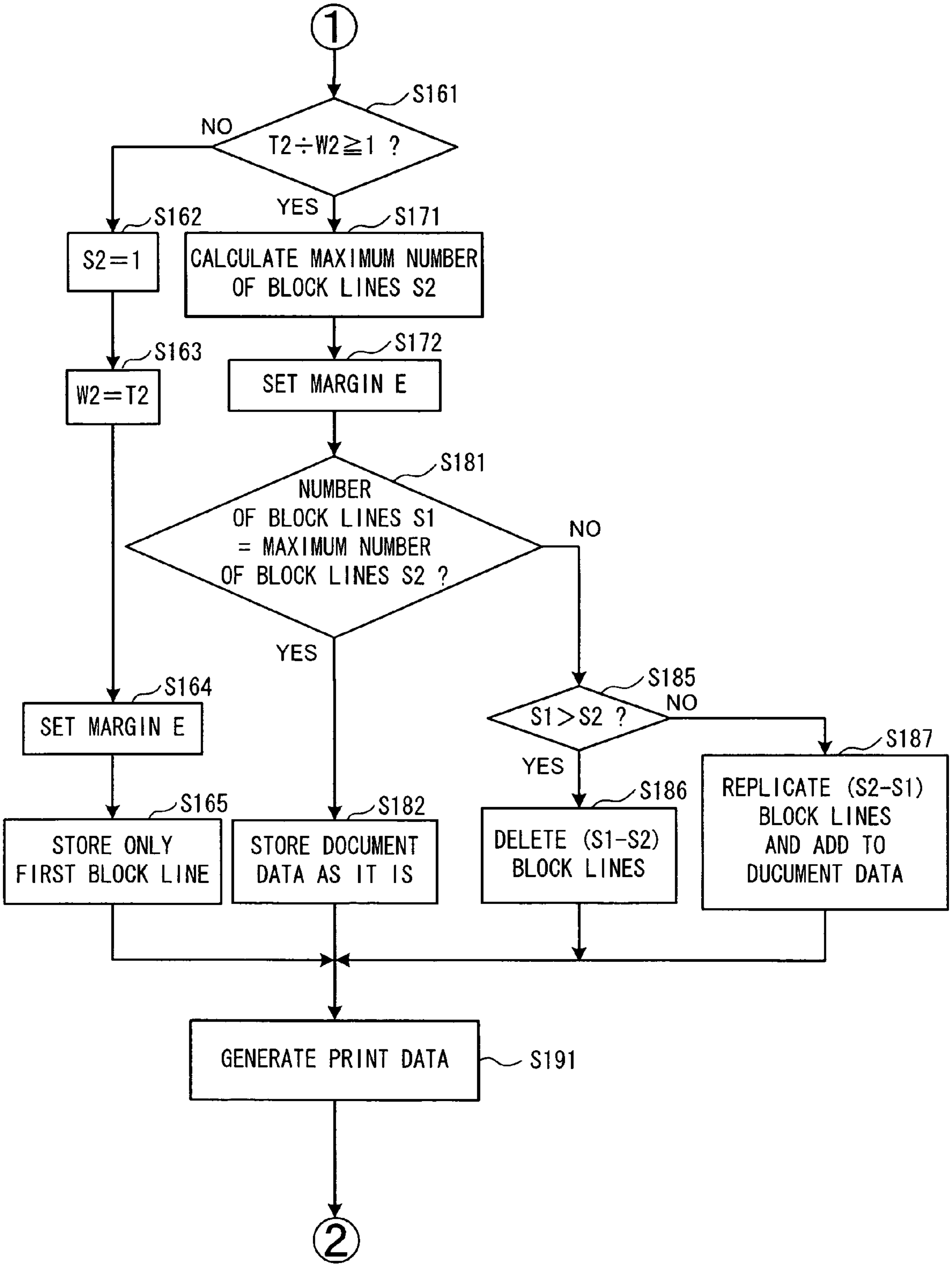
FIG. 9 is a flowchart of the tape print control processing of the tape printer, which is continued from FIG. 8.

Up to here, a case has been described in which the document data stored in the text buffer 141 is constituted of only character code and line feed code, while no block separation code is included (in FIG. 8, S103: NO) as in the example shown in FIG. 14. On the other hand, if the document data includes a block separation code (in FIG. 8, S103: YES) as shown in FIG. 15, the processing shown in FIG. 9 is carried out. The CPU 101 determines whether a value obtained by dividing the printable height T2 by the block line height W2 is 1 or more (S161). The printable height T2 can be calculated according to an equation $T2=T-2E$, using the tape width T stored in the tape width storage area 145 and the margin height E stored in the margin size storage area 146. Further, the block line height W2 can be calculated, using the number of the line feed codes in a single block in the document data stored in the text buffer 141, the character size of the characters in the block stored in the print format storage area 144, and the margin height of the margin between the lines stored in the margin size storage area 146. The calculated block line height W2 is stored in the block line height storage area 148 of the RAM 104.

When the quotient of T2 divided by W2 is smaller than 1 (S161: NO), it means that the set block line height W2 already exceeds the printable height T2 of the print tape 67. Therefore, if the block line height W2 remains unchanged, no block line can be printed. Therefore, the CPU 101 executes processing for adjusting the block line height W2 to enable printing a single block line. More specifically, a maximum number of block lines S2, which is a maximum number of block lines that can be accommodated within the tape width T, is set to 1, and S2 (=1) is stored in the maximum number of block lines storage area 152 of the RAM 104 (S162). The block line height W2 is then set to the printable height T2, and W2 (=T2) is stored in the block line height storage area 148 of the RAM 104 (S163). Because the maximum number of block lines S2 is 1, the margin height E of the upper/lower margin and the margin between the lines is set again such that a single block line having the block line height W2 (=T2) is disposed with equal spacing in the tape width direction (S164). More specifically, the margin height E is calculated according to an equation $E=(T-W2)/2$, using the tape width T stored in the tape width storage area 145 and the block line height W2 stored in the block line height storage area 148. At this time, the margin height E of the upper/lower margin and the margin between the lines stored in the margin size storage area 146 is overwritten with a newly calculated value. Of the document data stored in the text buffer 141 of the RAM 104, only data of the first block line is extracted and stored as a modified document data in the modified text buffer 142 (S165). For example, when the document data shown in FIG. 15 is stored in the text buffer 141, "A, B, C, . . . 8, 9, 0, block separation code, block separation code" (1st-26th line in FIG. 15), which is the data of the first block line, is stored as the modified document data in the modified text buffer 142.

If a value obtained by dividing the printable height T2 by the block line height W2 is 1 or more (S161: YES), the CPU 101 calculates the maximum number of block lines S2, referring to the tape width storage area 145, the margin size storage area 146 and the block line height storage area 148. The calculated maximum number of block lines S2 is stored in the maximum number of block lines storage area 152 of the RAM 104 (S171). For example, the maximum block line number S2 can be obtained according to the equation $S2=\text{floor}\{(T-W2)/(W2+E)\}$ as in the case of the document data including no block separation code described above.

After the maximum block line number S2 is calculated (S171), the CPU 101 sets the margin height E of the upper/lower margin and the margin between the lines again such that the maximum number of block lines S2 are disposed with equal spacing in the tape width direction (S172). More specifically, the margin height E is calculated according to an equation $E=(T-S2\cdot W2)/(S2+1)$, referring to the tape width storage area 145, the block line height storage area 148, and the maximum number of block lines storage area 152. At this time, the margin height E of the upper/lower margin and the margin between the lines stored in the margin size storage area 146 is overwritten with a newly calculated value.

After the margin E is set again (S172), the CPU 101 calculates the number of block lines S1, which is the number of the block lines included in the document data stored in the text buffer 141, and determines whether the maximum number of block lines S2 is equal to the number of block lines S1 (S181) The number of block lines S1 can be obtained based on the number of the block line feed data, that is, two successive block separation codes, contained in the document data stored in the text buffer 141. For example, because the document data shown in FIG. 15 contains two block line feed data, the number of block lines S1 can be obtained as 2. If the number of block lines S1 is equal to the maximum number of block lines S2 (S181: YES), the same number of block lines (S=S2) can be printed to fit within the tape width T. Therefore, the document data stored in the text buffer 141 of the RAM 104 is replicated as it is, and stored in the text buffer 142 as a modified document data (S182).

On the other hand, if the number of block lines S1 is different from the maximum number of block lines S2 (S181: NO), it is determined whether the number of block lines S1 is larger than the maximum number of block lines S2 (S185). If the number of block lines S1 is larger than the maximum number of block lines S2 (S185: YES), it means that the previously used print tape 67 has been replaced with another tape having a smaller width. Thus, the number of block lines needs to be reduced so that the blocks with the currently set block line height W2 can be accommodated within the tape width T. Thus, the CPU modifies the document data stored in the text buffer 141 by deleting data corresponding to the number of block lines (S1−S2) from the end, and stores the modified document data in the modified text buffer 142 (S186). For example, if the number of block lines S1 of the original document data is 2 (S1=2) as shown in FIG. 15 and S2 is calculated as 1 (S2=1) in S171, the data corresponding to one block line, the number of which is obtained by S1−S2, is deleted from the end of the document data. In the example of FIG. 15, "A, B, C . . . 8, 9, 0, block separation code, block separation code" (27th-35th lines in FIG. 15), which is the data of the second block line, is deleted and remaining data is stored in the modified text buffer 142 as the modified document data. On the other hand, if the number of block lines S1 is smaller than the maximum number of block lines S2 (S185: NO), it means that the previously used print tape 67 has been replaced with another tape having a larger width. Thus, the number of block lines needs to be increased so that the blocks with the set block line height W2 can be printed to occupy the tape width T to the fullest extent. Then, the CPU 101 replicates data corresponding to the (S2−S1) block lines from the beginning of the document data stored in the text buffer 141. Then, document data in which the replicated data is added to the end of the original document data is stored in the modified text buffer 142 as modified document data (S187). For example, when S2=3 is obtained in the example of FIG. 15, S2−S1=1. Consequently, the data of the first block line "A, B, C, . . . 8, 9, 0, block separation code, block separation code" (1st-26th line in FIG. 15) is replicated and added just after the end of the data of the second block line (after the 35th line in FIG. 15) and thus modified document data is stored.

Figure 13:
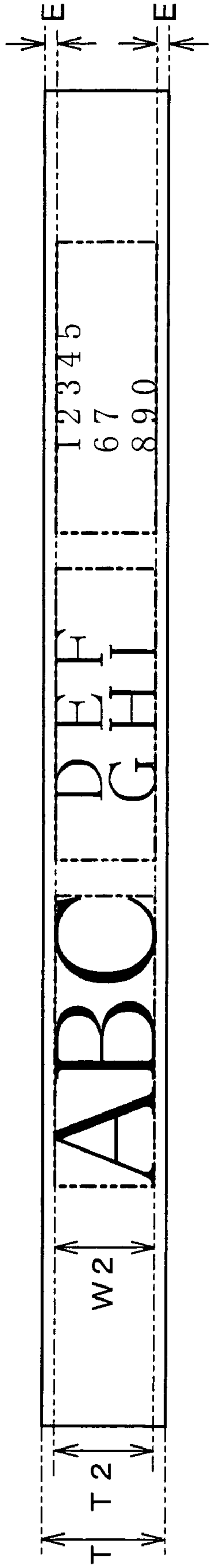
FIG. 13 is an explanatory diagram of printing result of the blocks of FIG. 12 after replacing the print tape with another print tape having a smaller tape width.

As described above, the document data stored in the text buffer 141 is modified corresponding to the maximum number of block lines S2 and the modified document data is stored in the modified text buffer 142 (S165, S182, S186, S187). After that, the CPU 101 generates print data by any known method for the document data corresponding to S2 block lines disposed in the tape width direction, based on the modified document data stored in the modified text buffer 142 and the margin height E of the upper/lower margin and the margin between the lines stored in the margin size storage area 146. The generated print data is overwritten with the generated print data in the print buffer 143 (S191). The CPU 101 successively reads out data from the print buffer 143 and drives the thermal head 11 and the tape feeding motor 37 to print the blocks on the print tape 67 with the thermal head 11 (S192). Then, the processing is terminated. In the example of the blocks printed over two block lines shown in FIG. 12, if the tape is replaced with another tape having a smaller width than the initial one and only one block line is printed corresponding to the calculated maximum number of block lines S2=1, the print result as shown in FIG. 13 can be obtained. As shown in FIG. 13, the blocks can be printed with the block line height W2 unchanged, that is, the block size unchanged, and with the margin height E adjusted corresponding to the maximum number of block lines S2.

In the tape printer 1 of the embodiment as described above, once a character or a block as a print object are inputted by a user and a character size and a margin size are set, even if the tape cassette 51 is replaced so that the tape width of the print tape 67 is changed, the size of a printed character or a block remains unchanged. Instead, the number of characters and blocks arranged in the tape width direction, that is, the number of lines or block lines is automatically adjusted to the maximum number of lines or maximum number of block lines. Therefore, an expected print result can be obtained even when the tape width is changed as shown in FIGS. 10-13. In particular, when the tape width is made smaller, for example, from the example shown in FIG. 12 to the example shown in FIG. 13, two blocks will not be forcibly arranged in the tape width direction, unlike the case of the conventional printer. Thus, it is possible to avoid such an inconvenience that character size is reduced so that the characters become illegible. Further, if a user does not want to change the character size even when the tape width is changed, the user does not need to reedit the character size. Further, because the number of lines is adjusted considering the height of the margins provided in the tape width direction, there is no problem that the printing is interrupted due to shortage of the margins. In addition, because the height of the margins is adjusted when the number of lines is adjusted, appropriate margins are provided. Consequently, a print result with an excellent appearance can be obtained.

The configuration of the tape printer 1 of the above-described exemplary embodiment is only an example and may be modified in various ways as in the following examples.

In the exemplary embodiment, the tape printer 1 loaded with the tape cassette 51 containing the receptor type print tape 67 having a previously laminated separation sheet. However, other tape printers may be employed in which tape cassettes which accommodate other types of print tapes. For example, a laminated type print tape on which the separation sheet is laminated after printing.

In the exemplary embodiment, the detection switches 6 provided on the tape printer 1 and the identification holes 661 formed in the tape cassette 51 are used to detect the tape width of the print tape 67. However, other configuration may be employed if combinations of ON/OFF signals from the detection switches 6 can be detected. For example, instead of the identification holes 661, concave portions formed on the outer surface of the identification portion 66 and dented toward the center in the width direction of the tape cassette 51 may be employed.

In the exemplary embodiment, a character string consisting of alphabets and a block consisting of alphabets and numerals are described as examples of print objects. Other than these characters, a symbol or a graphic, for example, may be processed in the same way. For example, a symbol "♪" may be used as a pattern and document data in which a number of this symbol having a desired size are arranged in one line may be created, considering the tape width of the print tape initially loaded. Then, tapes of various widths with the "♪" patterns printed all over with the desired size may be conveniently created.

In the exemplary embodiment, identical characters or blocks are printed over plural lines or block lines as shown in FIG. 10 and FIG. 12. However, different characters or blocks including different characters can be printed for each line or each block line.

What is claimed is:

1. A printer comprising:

a feeding device that feeds a tape-like print medium along a length direction of the print medium;

a printing device that prints a character on the print medium;

a storage device that stores original data including unit data, line feed data, and line height data, the unit data being data of a unit including at least one character, the line feed data specifying a separation position of a line of at least one unit to be printed on the print medium along the length direction, and the line height data indicating a height of the line of the at least one unit;

a tape width detecting device that detects a tape width, the tape width being a width of the print medium in a direction perpendicular to the length direction;

a maximum number of lines calculating device that calculates a maximum number of lines based on the line height data stored in the storage device and the tape width detected by the tape width detecting device, the maximum number of lines being a maximum number of lines that can be accommodated within the tape width when the height of the line of the at least one unit is unchanged;

a print data generating device that generates print data corresponding, to the maximum number of lines calculated by the maximum number of lines calculating device from the original data stored in the storage device; and a printing control device that controls the printing device based on the print data generated by the print data generating device;

a number of lines calculating device that calculates a number of lines of the at least one unit as an original number of lines based on a number of the line feed data stored in the storage device; and a number of lines determining device that compares the original number of lines calculated by the number of lines calculating device with the maximum number of lines calculated by the maximum number of lines calculating device to determine which is larger, wherein:

the print data generating device generates the print data by adding to the original data the unit data corresponding to a number of lines obtained by subtracting the original number of lines from the maximum number of lines, when the number of lines determining device determines that the original number of lines is smaller than the maximum number of lines; and the print data generating device generates the print data by excluding from the original data the unit data corresponding to a number of lines obtained by subtracting the maximum number of lines, when the number of lines determining device determines that the original number of lines is larger than the maximum number of lines.

2. The printer according to claim 1, wherein the unit consists of one character.

3. The printer according to claim 1, wherein the unit includes at least one line of at least one character to be printed on the print medium along the length direction and a unit separator for specifying a separation position of the unit.

4. The printer according to claim 1, further comprising:

a margin height storage device that stores a margin height data indicating a height of a margin provided in the tape width direction of the print medium, wherein:

the maximum number of lines calculating device calculates the maximum number of lines based on the line height data, the tape width, and the margin height data.

5. The printer according to claim 4, further comprising:

a print height calculating device that calculates a print height based on the line height data stored in the storage device and the maximum number of lines calculated by the maximum number of lines calculating device, the print height being a sum of heights of print portions in the tape width direction, the print portions being subject to printing on the print medium; and a margin adjusting device that adjusts the margin height based on the tape, width and the print height calculated by the print height calculating device.

6. A non-transitory computer-readable recording medium storing a print control program for a printer, the printer having a feeding device that feeds a tape-like print medium along a length direction of the print medium and a printing device that prints a character on the print medium, and the print control program comprising:

instructions for acquiring original data including unit data, line feed data, and line height data, the unit data being data of a unit including at least one character, the line feed data specifying a separation position of a line of at least one unit t to be printed on the print medium along the length direction, and the line height data indicating a height of the line of the at least one unit;

instructions for detecting a tape width, the tape width being a width of the print medium in a direction perpendicular to the length direction;

instructions for calculating a maximum number of lines based on the acquired line height data and the detected tape width, the maximum number of lines being a maximum number of lines that can be accommodated within the tape width when the height of the line of the at least one unit is unchanged;

instructions for generating print data corresponding to the calculated maximum number of lines from the acquired original data; and instructions for controlling drive of the printing device of the printer based on the generated print data;

instructions for calculating a number of lines of the at least one unit as an original number of lines based on a number of the acquired line feed data; and instructions for comparing the calculated original number of lines with the calculated maximum number of lines to determine which is larger, wherein:

the instructions for generating the: print data generates the print data by adding to the acquired original data the unit data corresponding to a number of lines obtained by subtracting the original number of lines from the maximum number of lines, when it is determined that the original number of lines is smaller than the maximum number of lines; and the instructions for generating the print data generates the print data by excluding from the acquired original data the unit data corresponding to a number of lines obtained by subtracting the maximum number of lines from the original number of lines, when it is determined that the original number of lines is larger than the maximum number of lines.

7. The non-transitory computer-readable recording medium according to claim 6, wherein the unit consists of one character.

8. The non-transitory computer-readable recording medium according to claim 6, wherein the unit includes at least one line of at least one character to be printed on the print medium along the length direction and a unit separator for specifying a separation position of the unit.

9. The non-transitory computer-readable recording medium according to claim 6, further comprising: instructions for acquiring a margin height data indicating a height of a margin provided in the tape width direction of the print medium, wherein:

instructions for calculating the maximum number of lines instructs to calculate the maximum number of lines based on the line height data, the tape width and the margin height data.

10. The non-transitory computer-readable recording medium according to claim 6, further comprising:

instructions for calculating a print height based on the line height data included in the acquired original data and the calculated maximum number of lines, the print height being a sum of heights of print portions in the tape width direction, the print portions being subject to printing on the print medium; and instructions for adjusting the margin height based on the tape width and the calculated print height.

* * * * *